United States Patent

[11] 3,588,796

| [72] | Inventors | Fontaine C. Armistead<br>Darien;<br>Peter L. Paull, Weston, Conn. |
|---|---|---|
| [21] | Appl. No. | 820,036 |
| [22] | Filed | Apr. 16, 1969 |
| [45] | Patented | June 28, 1971 |
| [73] | Assignee | Texaco Inc.<br>New York, N.Y.<br>Continuation of application Ser. No.<br>600,368, Aug. 14, 1967, now abandoned. |

[54] METHOD AND APPARATUS FOR POSITIONING A MANEUVERABLE NAVAL STRUCTURE OVER A FIXED POSITION
14 Claims, 9 Drawing Figs.

[52] U.S. Cl. .................................................... 340/6, 114/144
[51] Int. Cl. .................................................... G01s 3/00

[50] Field of Search ........................... 340/2, 3, 4.5, 6, 16 (R); 114/144

[56] References Cited
UNITED STATES PATENTS
3,160,850 12/1964 Dudley ........................ 340/6

OTHER REFERENCES
Ragland, OCEAN SCI. AND OCEAN ENGN., Vol. 2, 1965, pp. 1145– 1151, 1153, 1155, relied on.

*Primary Examiner*—Richard A. Farley

ABSTRACT: A method and apparatus for controlling the position of a maneuverable naval structure which is floating upon or immersed in the sea so that it is over a fixed position by the combination of an ultrasonic beam directed to a receiving apparatus which generates an electrical signal indicative of both the distance and the direction which the beam receiving means is off the center of the received beam, with propulsive means supported by said structure responsive to said signal to align the beam receiving means with the received beam.

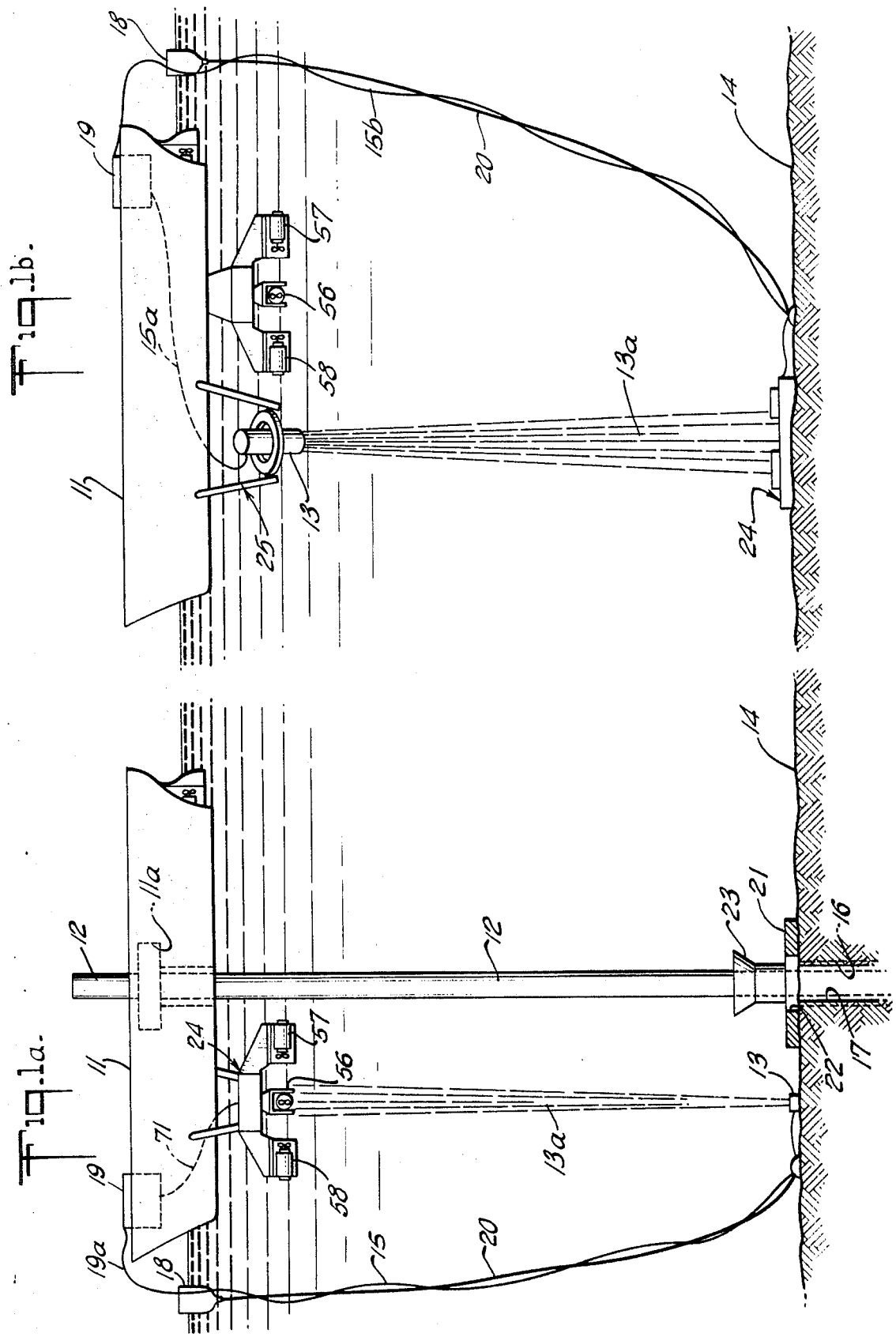

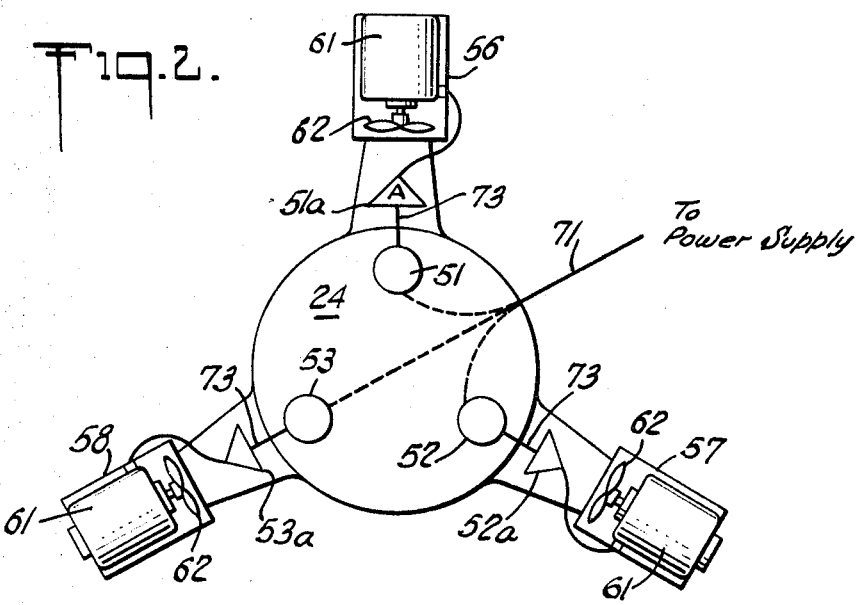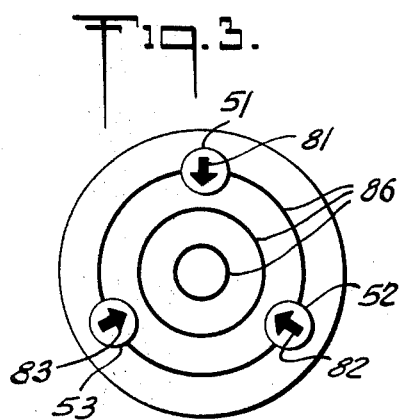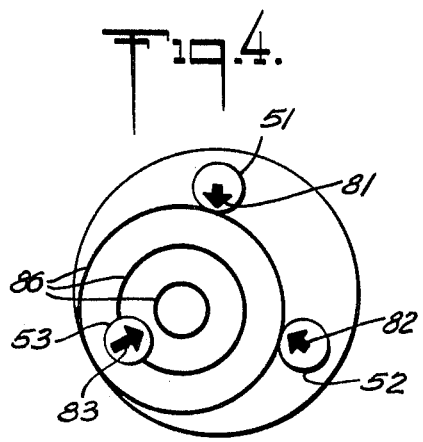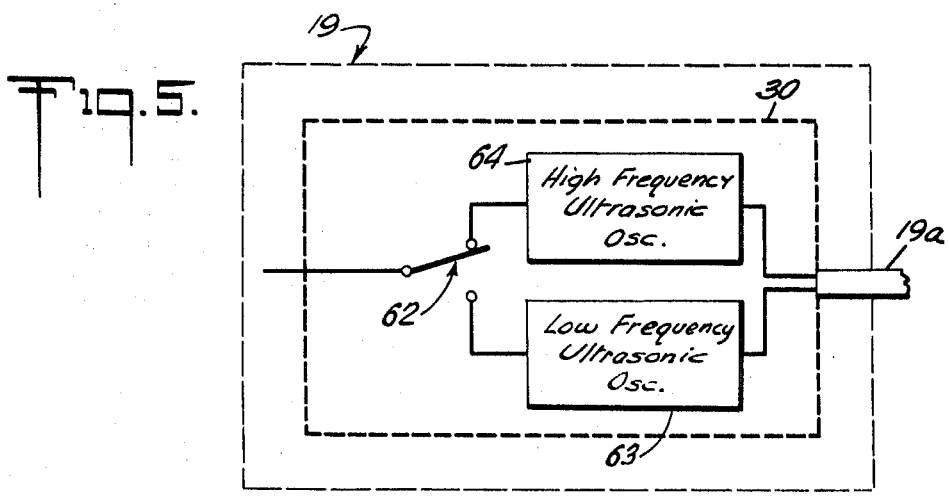

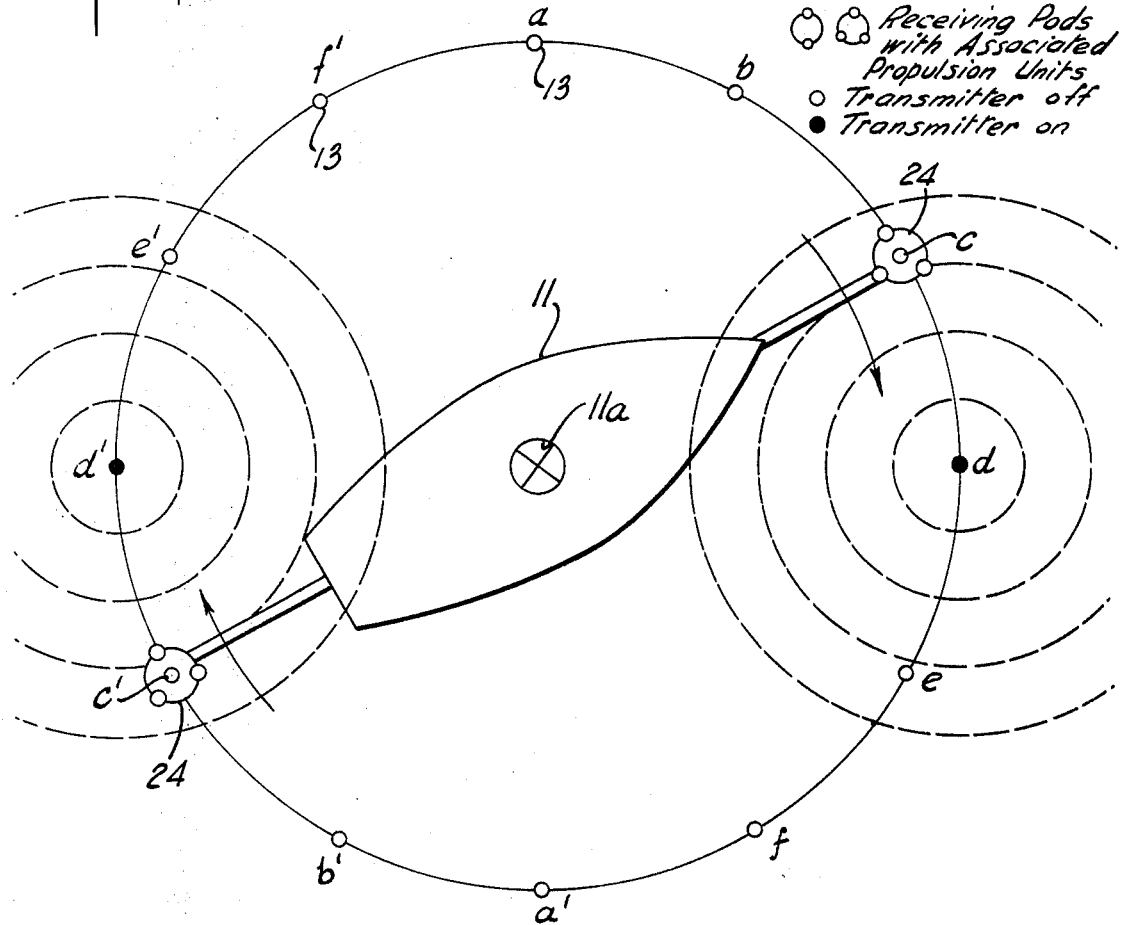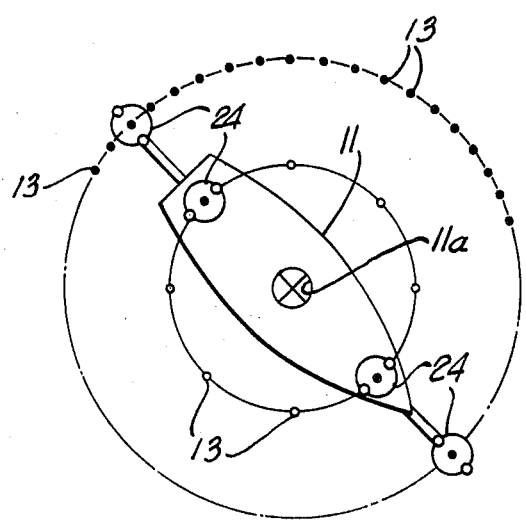

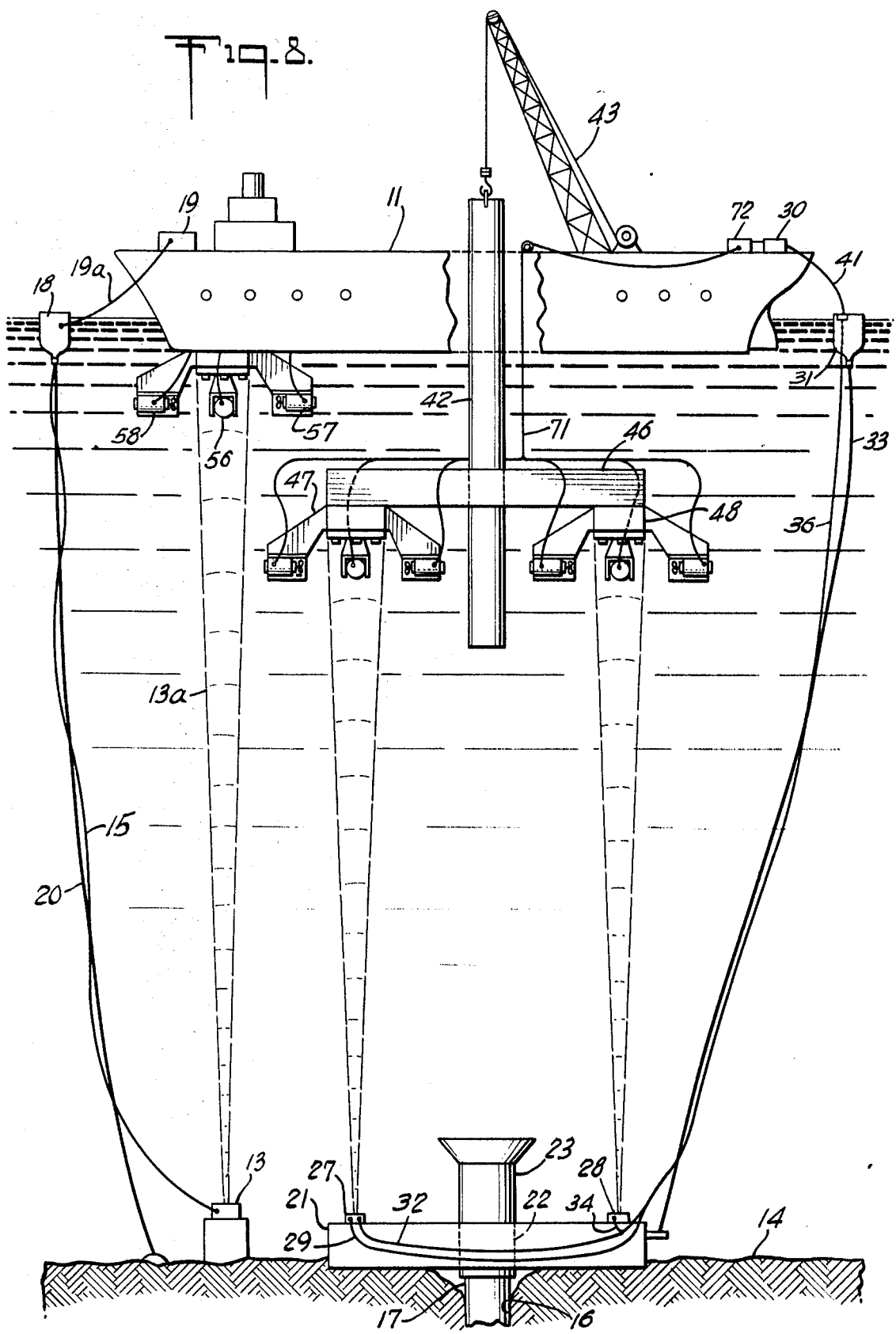

METHOD AND APPARATUS FOR POSITIONING A MANEUVERABLE NAVAL STRUCTURE OVER A FIXED POSITION

CROSS REFERENCES

This application is a continuation of now abandoned application Ser. No. 600,368 filed Aug. 14, 1967 which was a continuation-in-part application of the copending, coassigned application for Pat. for Sonic Means and Method for Locating and Introducing Equipment into a Submarine Well, Ser. No. 451,955, filed Apr. 29, 1965, by P. L. Paull and F. C. Armistead, now as U.S. Pat. No. 3,336,572 on Aug. 15, 1967.

FIELD OF THE INVENTION

This invention relates generally to deep water operations, such as offshore drilling of wells, and more particularly to ultrasonic means and method for positioning a vessel with respect to a fixed location under water and for providing that equipment carried by the vessel can be guided to the fixed location under water as it is lowered from the vessel.

DESCRIPTION OF THE INVENTION

In deep water drilling, a known means for guiding equipment and tools into a submarine well is by the use of guide cables which extend from the underwater wellhead equipment to the drilling vessel. The equipment to be indexed with the submarine well is attached to an equipment bracket which is adapted to be attached to the guide cables such that the bracket and equipment are guided along the cables to the well and the equipment entered therein. The main disadvantage of this arrangement is the large drift caused by strong underwater currents affecting the guide cables and the equipment being guided thereby so that the equipment when adjacent the underwater well may not be in a vertical position conducive to easy entry therein. Another disadvantage is the frequent entanglement of the cables due to the underwater currents or the mishandling thereof.

The guide cables offer a very limited range of drift of the drilling vessel, which range may be exceeded because of storm conditions which would require disconnecting the guide cables from the ship and subsequently relocating and disentangling them.

Guide means other than cables such as a permanently attached conduit extending between the submarine wellhead and the drilling vessel are utilized. However, it has been found that such a conduit offers considerable surface area to the strong underwater currents and accordingly gives rise to considerable drift as well as being a hazard to navigation if the well has to be abandoned.

SUMMARY OF THE INVENTION

It is an overall object of the present invention to provide ultrasonic means for positioning a floating vessel with respect to a fixed location under water and for guiding equipment from the vessel to the fixed location, e.g. to a submarine well for entry thereinto.

This objective is achieved by a system comprising means for generating beams of energy for transmission through the water and directing these beams toward means for receiving such directed beams. It is the beam receiving means and the to position a predetermined location in the vessel directly over or in some other specified relationship with respect to the fixed location under water. Defining a line drawn from the predetermined location to the fixed location as the axis, each beam receiving means is positioned laterally with respect to the axis as one of the beam transmitting means is positioned with respect to the axis. The beam receiving means generates electric signals indicative of the amount and direction off center of said beam receiving means with respect to said beam. Propulsion means interconnected with the beam receiving means are also provided for aligning the beam receiving means and the beam in accordance with the electric signals so that the floating vessel will be positioned with respect to the fixed location under water.

Similarly, in the case of an equipment bracket carried by the vessel which is to be lowered from the vessel and guided to a predetermined location under water, there are provided beam generating means suitably positioned with respect to the predetermined location, beam receiving means affixed to the equipment bracket and positioned with respect to the equipment on the bracket as one of the beam transmitting means is positioned with respect to the predetermined location under water, and also propulsion means interconnected with the beam receiving means for aligning the receiving means with respect to the beam in accordance with electric signals from the beam receiving means so that the equipment bracket will be positioned with respect to the predetermined location and continuously so positioned as the bracket is lowered from the vessel, and the equipment carried by the bracket will be guided to a desired location relative to the predetermined location. Specifically, if the equipment is a drill bit and the predetermined location under water is the center of an underwater well, the bit will be guided so as to enter the well.

Further, a plurality of ultrasonic transmitting means are positioned symmetrically about the fixed location under water, and a plurality of ultrasonic receiving means are also provided at corresponding lateral positions with respect to a location in the vessel as said ultrasonic transmitting means are positioned with respect to the fixed location under water. A predetermined one of the ultrasonic transmitting means is energized by switching means to produce a relatively low frequency, wide angle ultrasonic beam directed toward the ocean surface. The vessel is maneuvered near to where this beam reaches the surface, and one of the ultrasonic receiving means picks up the beam. This receiving means provides an electric signal proportional to the sound intensity received thereby and the vessel is then maneuvered until a maximum electric signal is obtained. The switching means is activated to change the frequency of the predetermined one of the ultrasonic transmitting means so that the low frequency, wide angle ultrasonic beam is replaced by a relatively high frequency, narrow angle ultrasonic beam and to simultaneously energize the other ultrasonic beam transmitting means to produce relatively high frequency, narrow angle ultrasonic beams directed toward the ocean surface. The ultrasonic receiving means which picked up the relatively low frequency beam is also responsive to the relatively high frequency ultrasonic beam. The vessel is caused by its propulsion units to rotate about the vertical axis of the ultrasonic receiving means which has picked up the beam from the predetermined one of the ultrasonic transmitting means until the other narrow angle ultrasonic beams are received by their corresponding ultrasonic receiving means. Each ultrasonic receiving means includes at least three sensing means for sensing the distance and direction off center of the receiving means with respect to its intercepted beam sensed by said sensing means to maintain each of the receiving means centered on its intercepted beam. In this manner, a drilling vessel may be positioned and continuously held in position with respect to a submarine well. Then by a separate operation, equipment carried by the vessel may be guided down along another set of beams as described above and introduced into the well.

Other objects, features and advantages of this invention and the manner of attaining them will become more apparent by reference to the following description of an embodiment of the invention taken in conjunction with the accompanying drawings.

BRIEF DESCRIPTION OF THE DRAWINGS

FIGS. 1a and 1b are schematic diagrams of the drilling vessel and the apparatus for locating a submarine location.

FIG. 2 is a bottom view of one of the ultrasonic receiving pods and the associated propulsion units.

FIG. 3 is a schematic bottom view of the ultrasonic receiving pod showing the isointensity lines of the sonic field in the ultrasonic beam arranged on the ultrasonic receiving pod when the pod is centered on the beam.

FIG. 4 is a schematic bottom view of an ultrasonic receiving pod similar to FIG. 3 but showing the isointensity lines of the sonic field in the ultrasonic beam received by the pod when it is off center of the beam in the direction shown.

FIG. 5 is a partial schematic block diagram of the ultrasonic transmitter frequency switching means located in the power supply and control console on the vessel.

FIG. 6 is a schematic diagram of the development of the basic disclosures of FIGS. 1a and 1b, showing how a vessel can be made to shift conveniently from alignment with one pair of diametrically opposed transmitters to alignment with another pair, the transmitters being centered around the well.

FIG. 7 is a further improvement over the disclosure of FIG. 6, showing an outer circle of continuous control and an inner circle of control points as shown in FIG. 6.

FIG. 8 shows how the locating and positioning apparatus is applied to the combination of a drilling vessel and equipment bracket supported therefrom.

DESCRIPTION OF THE PREFERRED EMBODIMENT

As disclosed herein, it is possible to locate a floating vessel adjacent a submarine well using ultrasonic beams and then using the same principle, to lower equipment from the vessel into the well. Where feasible, throughout the drawings, the same numeration will be used for the same or like elements.

Referring to FIG. 1a, there is shown a drilling vessel 11 with a center well 11a, through which extends a pipe 12, either for drilling or for well servicing of the submarine well 16.

The wellhead equipment located on the ocean bottom 14 is arranged around the well 16 which has been previously drilled and lined with casing 17, usually cemented in place. A wellhead base member 21 is provided, consisting of a cement block with a large area extending over the ocean bottom 14 so as to prevent sinking of the wellhead equipment into the silt or mud which may be present there. The wellhead base member 21 contains an opening 22 therethrough by means of which access to the well is provided. The wellhead base member 21, in this case, has a member 23 extending from the opening 22 therein towards the ocean surface, which member 23 has a funnel shape to aid in the introduction of the equipment into the well.

Spaced from the well bore 16 and shown separate from the wellhead base member 21, although certain situations may require that it be supported by the base member, is an ultrasonic frequency beam transmitter 13, emitting beam 13a. This transmitter may be one of the well-known types of transducers for transmitting ultrasonic sound such as the magnetostrictive or piezoelectric types. Electrical energization for the transmitter 13 is supplied through the electrical lead 15 which extends from the transmitter to the buoy 18, adapted to have an electrical connection thereat to the power supply and control console 19 on vessel 11. The buoy is anchored to the ocean floor adjacent transmitter 13 by the anchor line 20, and electrical lead 15 follows alongside the anchor line. Alternatively, and not shown, the electrical lead may be separable from the anchor line so that when not electrically connected, it can be dropped to the ocean bottom below the buoy on a recovery line which has its upper end tied to the buoy. This arrangement would protect the electrical lead from unnecessary flexing and wear when not in use. When it is desired to reconnect the lead electrically, the lead is drawn to the surface by means of the recovery line. Further, a nuclear source of energy could be used for activating the transmitter.

An ultrasonic receiving pod is shown at 24, and propulsion units at 56, 57 and 58.

Referring to FIG. 1b, a transmitter 13 is ring mounted by a gimbal structure 25 supported from vessel 11, directing an ultrasonic beam 13a downwardly toward the ultrasonic receiving pod 24, now resting on the ocean bottom 14. The transmitter is energized by lead 15a from the power supply and control console 19, while the response from the receiving pod 24, after being amplified, is transmitted by lead 15b via the buoy 18 to the console 19 for proper activation of the propulsion units 56, 57, 58, which are electrically interconnected to the console 19 by appropriate means, (not shown).

As in the case of FIG. 1a, buoy 18 is anchored to the ocean bottom by the anchor line 20 and lead 15b can be used in the same manner as lead 15 when it is separated from the anchor line.

Referring to FIG. 2, the ultrasonic receiving pod 24 has three sonic receiving transducers 51, 52 and 53 equally spaced about a circle which is concentric with the pod. Associated with each of the ultrasonic receiving transducers is a propulsion unit 56, 57 and 58, respectively. Each of the units includes a motor 61 and propeller 62 located in a housing which extends radially outward and downward of the ultrasonic receiving pod. The motor driven propeller 62 produces a thrust on the pod which is directed radially of the pod to make correcting adjustments so as to align, i.e. center, the ultrasonic receiving pod with respect to the ultrasonic beam. The ultrasonic receiving transducers 51, 52 and 53 may be any of the conventional ultrasonic receivers such as are used in underwater sound apparatus. The particular ultrasonic receivers used should be designed to operate within the frequency ranges of the ultrasonic transmitters used, for example, 1 megacycle per second frequency. The motors 61 are of the synchronous type such as are used in conventional servo systems. These motors provide an output rotational speed which is proportional to the electrical input signal. The power is supplied to the motors 61 and receiving transducers 51, 52 and 53 through a power cable 71 extending from the console 19 located on the vessel 11 (see FIGS. 1a and 1b). A conductor 73 from each of the ultrasonic receiving transducers to each of the motors carries the controlling electrical signal derived from the associated ultrasonic receiving transducer. It will be appreciated that each of the ultrasonic receiving transducers and the associated propulsion units is connected in a servo loop which is completed through the positioning provided by the propulsion unit with respect to the beam being received. Amplification may be needed between the receiving transducers and their associated propulsion units. These amplifiers 51a, 52a and 52a associated with ultrasonic receiving transducers 51, 52 and 53, respectively are preferably located within the receiving pod itself.

In operation, the ultrasonic receiving transducers on a receiving pod produce equal strength electrical signals when the pod is centered on the ultrasonic beam. This is represented in FIG. 3 by the equal lengths of the arrows located in the middle of the three ultrasonic receiving transducers. The electrical signal is fed to the motor 61 in the associated propulsion unit which produces a proportional output rotational speed of the associated propeller thereby providing a corresponding centering thrust to the receiving pod. Since each of the electrical signals is equivalent, the thrust provided by each of the three propulsion units is equal and accordingly the receiving pod tends to stay centered on the ultrasonic beam. The circular lines 86 shown in FIG. 3 are representations of isointensity lines of the sonic field in the ultrasonic beam. It will be noted that the lines are heavier near the center of the pod. This indicates that the intensity increases toward the center and is greatest at the center of the beam.

In FIG. 4, the same isointensity lines 86 are depicted in a situation where the receiving pod is off center of the ultrasonic beam. As can be seen, the ultrasonic receiving transducer 53 of the receiving pod has been displaced toward the center of the beam and, accordingly, the arrow 83 associated with ultrasonic receiving transducer 53 is longer than the corresponding arrow in FIG. 3. The magnitude of the intensity of the beam is much greater at this receiving transducer since the intensity is greatest at the center of the beam as previously mentioned. Correspondingly, the length of the arrow in ultrasonic receiving transducer 52 has been reduced in comparison to the corresponding arrow in FIG. 3. The same is also true of arrow 81 in comparison to the arrow in ultrasonic receiving transducer 51. The larger electric signal produced by ultrasonic receiving transducer 52 will correspondingly increase the speed of rotation of the propeller 62 associated with motor 61 in propulsion unit 58 and a correspondingly greater centering thrust will be applied to the receiving pod from this unit 58 tending to center the pod on the ultrasonic beam. Likewise the reduced electrical signals from ultrasonic receiving transducers 51 and 52 will cause a corresponding slowing down of propellers 62 in units 56 and 57, respectively. It will be appreciated that these servo arrangements will tend to keep the receiving pod centered on the ultrasonic beam.

Referring to FIG. 5, the ultrasonic transmitter 13 is energized through switch 62 which when connected to low frequency ultrasonic oscillator 63 completes an electrical power path thereby energizing ultrasonic transmitter 13 so that it generates a relatively low frequency ultrasonic beam which is directed toward the ocean surface. The switch 62 when connected to the high frequency ultrasonic oscillator 64 energizes ultrasonic transmitter 13 to generate high frequency ultrasonic beams directed toward the ocean surface. The receiver pod 24 associated with ultrasonic transmitter 13 is capable of responding to the low frequency ultrasonic beam and is also capable of detecting the approximate center of the beam. It will be appreciated that the locating of the well can be performed also by means of a separate ultrasonic transmitter for transmitting at a relatively low ultrasonic frequency located adjacent the well in addition to the relatively high frequency ultrasonic transmitters. When a separate ultrasonic transmitter is utilized for generating the relatively low frequency ultrasonic beam, the receiving pods associated with the relatively high frequency ultrasonic transmitters can be utilized as the detecting means for the relatively low frequency sonic beam, or a separate receiving means can be utilized.

To locate a submarine well, the drilling ship 11 must find the float or buoy 18, which is anchored adjacent the well. In deep water operations, the buoy is subject to considerable drift and, therefore, does not necessarily indicate that the well head equipment is directly underneath. The electrical connection is made at the buoy between the vessel and the sonic transmitter which is energized so that a low frequency ultrasonic beam is generated and directed towards the surface of the ocean. The drilling vessel 11 is maneuvered until a maximum in received intensity indicates that the center or near center of the ultrasonic beam is detected by receiving pod 24. Then, the ultrasonic transmitter is switched to its high frequency mode of operation and the high frequency beam is within the receiving range of receiving pod 24 which, in conjunction with the propulsion units, causes the vessel to maneuver so as to lock on to the beam. The vessel has now been positioned accurately with respect to a predetermined underwater location.

The relatively low frequency ultrasonic waves tend to spread into a wide angle beam in water. Thus, such a beam at the surface of the ocean has a diameter which is dependent on the dimensions of the transmitting transducer, the transmitting frequency, and the depth at which the transmitter is located. These factors also affect the intensity of the sound wave.

It has been found that for a circular piston sonic transmitter of radius R, the half-apex angle A of the cone within which almost the whole of the sound of velocity V and frequency F is radiated is given by the formula:

$$\sin A = 0.61 \, V/FR$$

Information on the effects of frequency, depth and intensity have been provided in the above cited copending application for patent and is incorporated herein by this reference.

FIG. 6 shows how the basic embodiments of FIGS. 1a and 1b are developed so that a vessel 11 can be made to shift conveniently from alignment with one pair of diametrically opposed transmitters, e.g. 13, to alignment with another pair, if the conditions of wind and sea so dictate. Transmitters are designated in diametric pairs as $a$ and $a'$, $b$ and $b'$, etc. The FIG. represents a situation where the vessel has been aligned with the pair $c$ and $c'$ but now needs to be realigned with $d$ and $d'$. The power to transmitters $c$ and $c'$ has just been turned off and power to $d$ and $d'$ has just been turned on, as indicated by the dashed line rings representing cones of ultrasonic energy centered on transmitter locations $d$ and $d'$. From the mode of operation of the receiving pods and their associated propulsion units as set forth above, it is clear that the bow of the ship, near $c$, is shifted toward $d$, and the stern, near $c'$, is shifted toward $d'$, as indicated by the arrows in this FIG. . Thus, when wind and sea are changed in direction so that the vessel should lie at a different direction on the surface of the sea and yet maintain the center well directly over the well below. FIG. 6 shows that by turning off power to the currently used pair of transmitters and turning on power to an adjacent pair of transmitters, the operator of the vessel is able to rotate his vessel about its center well to a new alignment, or to one new alignment after another, until the optimum alignment is found, and at the same time never to lose register between the center well and the well below.

FIG. 7 shows a further improvement over the disclosure of FIG. 6. A large number of ultrasonic transmitters is located on the circumference of the circle as shown, with the result that instead of a number of discrete control points, located above corresponding transmitters, there is in effect a continuous circle of control, i.e. a control ring instead of a circular series of control points. The vessel's receiving pods are, as before, similarly located with respect to the center well, with the result that the vessel is free to align itself in any direction as impelled by wind and sea, all the while remaining locked in so that each receiving pod is directly over a portion of the ring of ultrasonic energy from the transmitters. This system may be made even more secure by the addition of another circle of a small number of transmitters but at a different radius from that of the large number of transmitters which form the continuous ring of ultrasonic energy. The receiving pods which lock in on the continuous ring may have only two receivers each, located athwart the circumference of the ring, i.e. aligned with a radius from the center of the ring, since their function is to call for corrections in the vessel's position radially only. The other circle having the small number of transmitters is monitored by a pair of receiving pods properly located on the vessel, and these receiving pods have two ultrasonic receivers each, located athwart a radius of the rings, since their function is to call for corrections in the vessel's portion in azimuth only.

FIG. 8 discloses the combination of the basic disclosures of FIGS. 1a and 1b with the disclosure in the above cited coassigned, copending application for patent, the disclosure of which is incorporated herein by this reference.

The same vessel, ultrasonic transmitter and receiver, with associated propulsion units, buoy, anchor line, console and leads for guidance of the vessel are disclosed with the same enumeration; along with the well and wellhead equipment of FIGS. 1a and 1b.

In addition, the base member 21 also has located thereon ultrasonic frequency transmitters 27 and 28, similar to transmitter 13. Transmitters 27 and 28 are located on the base member equidistant from opposite sides of the funnel shaped member 23 on the same diameter. It should be noted that the sonic transmitters 27 and 28, although shown equidistant from member 23, may be at different distances therefrom and on different diameters. The electrical energization for transmitter 27 is supplied through electrical leads 29 and 32. One lead is for a relatively high ultrasonic frequency energization of transmitter 27 while the other is for a relatively low ultrasonic frequency energization as has been explained previously. The energization of transmitter 28 is provided through a lead 34 which along with leads 29 and 32 are formed into a multiconductor cable 36 which extends between the submarine wellhead equipment and the buoy 31. The buoy is adapted to have an electrical connection made thereat which connects the multiconductor cable 36 to a further multiconductor cable 41 which extends between the buoy 31 and the vessel 11 so that connections can be made to the control console 30 and power supply 72. As required, there is an interconnection between consoles 19 and 30.

The sonic transmitters 27 and 28 each have a diameter of the order of 10 inches. They are designed to operate at approximately 1 megacycle per second frequency. This combination of transducer size and frequency produces sonic energy which is highly collimated, i.e., narrow angle sonic beams are produced which are directed from the submarine wellhead equipment to the surface of the ocean. At the surface, the drilling vessel is shown lowering a guide conduit 42 into the ocean by means of the derrick 43 located thereon. It will be appreciated that the equipment to be introduced into the well does not necessarily require a guide conduit and thus equipment such as a drilling string or logging tool may be lowered and guided by the sonic guide means of this invention directly. An equipment bracket 46 is attached near the lower end of the guide conduit 42. The equipment bracket 46 may be similar to those presently in use in deepwater drilling except for the changes at the lateral ends thereof necessitated by eliminating the usual guide lines and adapting the bracket to operate in conjunction with the sonic guide means. The bracket 46 has receiving pods 47 and 48 mounted at each end thereof. These pods 47 and 48 are similar to pod 24 and are adapted to locate and stay centered on the sonic beams generated by the sonic transmitters 27 and 28, respectively. The equipment to be guided to the submarine well is attached to the guide bracket at a point between the receiving pods 47 and 48 which corresponds to the location of the funnel shaped receiving member 23 with respect to the transmitting transducers 27 and 28, respectively. Thus, when the receiving pods 47 and 48 are located directly on the center of their respective beams, the guide bracket is correctly laterally positioned; i.e., the equipment being carried by the bracket 46 is vertically aligned with the funnel shaped member 23 at the submarine well so that entry into the well of the equipment being carried by the bracket can be accomplished.

The operation of the combination of FIG. 8 begins with essentially a repetition of the steps outlined for the operation of the devices disclosed in FIGS. 1a and 1b. After the vessel has been positioned with respect to an underwater location, e.g. a submarine well, and the wellhead buoy has been located, the wellhead equipment can be electrically energized from the power supply on the vessel which is electrically connected to the wellhead equipment by connecting means on the buoy 31. If desired, the electrical energization can result in the generation of a relatively low frequency wide angle ultrasonic beam of energy which extends from the wellhead equipment to the ocean surface, as in the case of FIG. 1a, and after it is received, the vessel can be maneuvered until substantially the center of the beam is located and the low frequency wide angle ultrasonic beam of energy replaced by a plurality of high frequency narrow angle ultrasonic beams of energy. The equipment to be lowered from the vessel is located with respect to said high frequency narrow angle ultrasonic beams such that each beam is separately received and the equipment to be entered into the well is indexed therewith. The equipment during lowering is maneuvered so as to remain substantially fixed with respect to said high frequency ultrasonic beams thereby locating and introducing said equipment into the well.

Thus, it has been shown and described how a floating vessel with its associated equipment can be maneuvered into and held in position over a fixed location by means of an ultrasonic beam which is fixed in direction and which cooperates with a continuous automatic control responsive to variations in ultrasonic beam intensity. Additionally, it has been shown and described how equipment carried by the vessel can be lowered and guided into a subsurface well, using the same principle involving ultrasonic beams and automatic control.

Obviously, other modifications and variations of the invention as hereinabove set forth, may be made without departing from the spirit and scope thereof, and therefore, only such limitations should be imposed as are indicated in the appended claims.

We claim:

1. In combination with a maneuverable naval structure, an automatic system for accurately positioning said structure with respect to a selected underwater location comprising a source for generating and directing a beam of energy in an underwater environment, means for receiving the directed beam of energy comprising an array of a plurality of receiving units sensitive to said energy of said beam, said receiving units being spaced from one another and disposed in a plane generally transverse to the longitudinal axis of said beam, each receiving unit generating an electric signal proportionally related to the energy of said beam received by said unit, whereby the relative values of the electric signals generated by the respective units is indicative of the distance and direction off center of the position of the beam receiving means with respect to the position of said directed beam, and propulsion means on said structure comprising a plurality of propulsion units, each propulsion unit being responsive to an electric signal from one of said receiving units such that said propulsion means causes said naval structure to move in a direction tending to cause said beam receiving means and said directed beam to come into a predetermined alignment, whereby said naval structure is positioned accurately with respect to said location.

2. In the combination as defined in claim 1, the energy generating source being positioned adjacent said underwater location and directing said beam of energy upwardly toward the water surface, the beam receiving means being supported by said naval structure also.

3. In the combination as defined in claim 1, the energy generating source being supported by said naval structure, the beam receiving means being positioned adjacent said underwater location and having electrical communication with said naval structure.

4. Apparatus for keeping a floating vessel positioned over a fixed underwater location comprising means for generating a plurality of ultrasonic frequency beams, each of the generating means being placed in a predetermined position with respect to said fixed location and directing a beam toward the surface of the water, a plurality of ultrasonic frequency receiving means supported by said floating vessel, each intercepting one of the ultrasonic beams, each of said receiving means being placed in a position which bears the same relationship to said floating vessel as said predetermined position bears to said fixed location, each receiving means including at least three sensing means for sensing the distance and direction off center of said receiving means with respect to the beam generated by the corresponding beam generating means, and propulsion means supported by said floating vessel for continuously correcting the position thereof in accordance with the distance and direction off center of each of said receiving means with respect to its intercepted beam sensed by said sensing means to maintain each of said receiving means aligned on its intercepted beam, whereby said floating vessel is kept in position.

5. Apparatus according to claim 4, wherein at least two ultrasonic frequency beam generating means are located on opposite sides of and in a straight line with said underwater location, the ultrasonic frequency beam generating means comprising an ultrasonic frequency transmitting transducer for each beam.

6. Apparatus according to claim 4, wherein each of said receiving means for intercepting an ultrasonic beam is a receiving pod, and each of said sensing means for sensing the distance and direction off center of said pod with respect to said intercepted beam comprises an ultrasonic frequency beam receiving transducer arranged on and equally spaced about a circle concentric with the downwardly facing surface of said pod for sensing the intensity of ultrasonic energy received from said beam and producing a corresponding electric signal.

7. Apparatus according to claim 6, wherein said propulsion means for continuously correcting the position of said floating vessel in accordance with the distance and direction off center of each of said receiving means with respect to its intercepted beam comprises a plurality of propulsion units attached to each of said receiving pods, each unit being controlled by one of said ultrasonic receiving transducers and including a servomotor and a propeller driven by said servomotor to produce a thrust proportional to said electric signal tending to center said receiving pod with respect to said beam.

8. Apparatus as defined in claim 4, in combination with apparatus for guiding equipment supported by said vessel into a submarine well located adjacent said underwater position, comprising a plurality of ultrasonic frequency beam transmitting transducers each placed at a predetermined lateral position from said well for generating and directing ultrasonic beams toward the surface of the ocean, an equipment bracket attached to said equipment and adapted to be lowered from said vessel on the surface of the ocean, a plurality of receiving pods placed on said equipment bracket each intercepting one of said ultrasonic beams, each of said receiving pods being placed at the same predetermined lateral position from said equipment carried by said bracket corresponding to the placement of each of said transmitting transducers from said well, at least three ultrasonic receiving transducers arranged on and equally spaced about a circle concentric with the downwardly facing surface of each receiving pod for detecting the intensity of ultrasonic energy received from the associated beam and producing a corresponding electric signal, a plurality of propulsion units attached to each of said receiving pods, each propulsion unit being controlled by one of said ultrasonic frequency beam receiving transducers and including a servomotor and a propeller driven by said servomotor to produce a thrust proportional to said electric signal tending to center said receiving pod with respect to said beam.

9. Apparatus according to claim 8, wherein a base member is provided having an opening therethrough communicating with said submarine well, and a funnel shaped member extending from the opening in said base member towards the ocean surface to facilitate entry of equipment attached to said equipment bracket into the submarine well.

10. Apparatus for keeping a floating vessel over a fixed underwater position comprising a plurality of ultrasonic frequency beam generating means, each of said generating means being located on a predetermined diametral location from said position and directing a beam toward the surface of the water, a plurality of ultrasonic frequency receiving means supported by said floating vessel each intercepting one of the ultrasonic beams, each of said receiving means being located at the same predetermined diametral position on said floating vessel as one of said ultrasonic frequency beam generating means is located from said position, each receiving means including at least two sensing means for sensing the distance and direction off center of said receiving means with respect to the beam generated by the corresponding laterally located beam generating means, and propulsion means supported by said floating vessel for continuously correcting the position thereof in accordance with the distance and direction off center of each of said receiving means with respect to its intercepted beam sensed by said sensing means to maintain each of said receiving means centered on its intercepted beam, whereby said floating vessel is kept over said position, said plurality of beam generating means comprising a large number thereof positioned along the circumference of a circle to provide a substantially continuous circular ultrasonic beam and another circle of a small number thereof, said another circle having a different radius from the first named circle and being concentric therewith, said receiving means being located in pairs on opposite sides on a straight line lengthwise of the vessel, the receiving means responsive to said continuous circular beam having its sensing means located in a radial direction to lie athwart thereof to control the position of said vessel radially, and the receiving means responsive to the beams from the small number of generating means having its sensing means located circumferentially to lie athwart a radius of the circles to provide for corrective control of the vessel in azimuth.

11. A method for positioning a vessel on the ocean surface with respect to a submarine well and for guiding equipment from said vessel into said well comprising the steps of positioning the vessel in the vicinity of a buoy indicating the general location of said well, electrically energizing subsurface equipment for and generating a relatively low frequency wide angle ultrasonic beam extending therefrom to said surface, receiving said low frequency ultrasonic beam, maneuvering said vessel until the received intensity of said low frequency ultrasonic beam is at maximum, electrically energizing additional subsurface equipment for and generating a plurality of relatively high frequency narrow angle ultrasonic beams, positioning said vessel so as to receive each of said high frequency ultrasonic beams and to index said equipment with said well.

12. A method according to claim 11, wherein the step of positioning said vessel so as to receive each of said high frequency ultrasonic beams comprises locking onto one of said high frequency beams and turning said vessel about the central axis of said one high frequency beam until each of the other beams is received and said vessel is indexed with the said well.

13. In the method as defined in claim 11, the additional step of maneuvering said equipment so as to remain substantially fixed with respect to high frequency ultrasonic beams generated and directed for reception thereby during lowering thereof for introducing equipment into said well.

14. A method according to claim 13, wherein said step of maneuvering said equipment so as to remain substantially fixed with respect to said high frequency ultrasonic beams during lowering comprises propelling said equipment separately with respect to each high frequency ultrasonic beam in accordance with the strength of the signal received from said beam so as to compensate for any drift of the equipment with respect to each of the respective beams.